(12) United States Patent
Kimelman et al.

(10) Patent No.: US 8,108,841 B2
(45) Date of Patent: *Jan. 31, 2012

(54) MINIMIZING INTERACTION COSTS AMONG COMPONENTS OF COMPUTER PROGRAMS

(75) Inventors: Douglas Neil Kimelman, Winnipeg (CA); Vadakkedathu T. Rajan, Briarcliff Manor, NY (US); Tova Roth, Woodmere, NY (US); Vugranam C. Sreedhar, White Plains, NY (US); Mark N. Wegman, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/037,080

(22) Filed: Feb. 25, 2008

(65) Prior Publication Data

US 2008/0163163 A1 Jul. 3, 2008

Related U.S. Application Data

(63) Continuation of application No. 10/073,628, filed on Feb. 11, 2002, now Pat. No. 7,360,205.

(51) Int. Cl.
*G06F 9/44* (2006.01)
(52) U.S. Cl. .................... 717/130; 717/141; 717/151
(58) Field of Classification Search ........... 717/129–151
See application file for complete search history.

(56) References Cited

U.S. PATENT DOCUMENTS

| 5,325,533 | A | * | 6/1994 | McInerney et al. | 717/107 |
| 6,173,437 | B1 | * | 1/2001 | Polcyn | 717/100 |
| 6,360,360 | B1 | * | 3/2002 | Bates et al. | 717/160 |
| 6,405,361 | B1 | * | 6/2002 | Broy et al. | 717/104 |
| 6,546,553 | B1 | * | 4/2003 | Hunt | 717/174 |

OTHER PUBLICATIONS

Keahey et al., PAWS: collective interactions and data transfers, IEEE, Aug. 7-9, 2001 pp. 47-54.*
Hogstedt et al., Optimizing Component Interaction, ACM Workshop on Optimization of Middleware and Distributed Systems (OM 2001), Snowbird, Utah, 2001, pp. 1-6.*

* cited by examiner

*Primary Examiner* — Anna Deng
*Assistant Examiner* — Satish Rampuria
(74) *Attorney, Agent, or Firm* — Michael J. Buchenhorner; Vazken Alexanian

(57) ABSTRACT

A method for minimizing total cost of interaction among components of a computer program, each of the components being characterized by at least one implementation property includes steps of: a) carrying out at least a partial run of the program; b) monitoring the at least partial run of the program to measure an amount of interaction between each pair of components; c) determining a cost of interaction between each pair of interacting components; d) determining a choice of implementation properties which minimizes total cost of the at least partial run; and e) assigning that choice of implementation properties to the components for a subsequent at least partial run of the program.

5 Claims, 2 Drawing Sheets

MINIMIZING INTERACTION COSTS AMONG COMPONENTS OF COMPUTER PROGRAMS

CROSS-REFERENCE TO RELATED APPLICATIONS

This application is a continuation of commonly-owned, U.S. application Ser. No. 10/073,628 filed Feb. 11, 2002, which in turn claims the benefit of U.S. Provisional Application No. 60/267,573, filed Feb. 9, 2001.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

This invention generally relates to the field of optimization of computer programs, and more particularly relates to a computer system that transforms programs so that they run more quickly or otherwise at lower cost, but produce the same results, by minimizing costs of interaction among program components.

BACKGROUND OF THE INVENTION

Programmers are increasingly programming by component assembly. This is despite the fact that the use of components tend to decrease the performance of the program. The programmers who design the components do not know anything about the environment the components will be used in, and can therefore not tailor the components for each specific use. The efficiency of a program suffers from the use of such generic components, since it fundamentally depends on the interactions between the components. The performance of a component based program is therefore often less than optimal. Optimizing component interaction is a fundamental problem in constructing efficient component-oriented programs.

Many computer programs, which consist of a number of program components, manipulate implementation properties such as string representations and data structure for which any of a number of implementation properties can be used. For example, string representations that can be used include: UNICODE, ASCII, and EBCDIC. As another example, data structures that can be used include: trees, compressed files and hash tables. In fact, in many database and virtual machine benchmarks, substantial amounts of time are lost in converting data representation values back and forth between a number of different representations.

One problem solved by this invention is that of minimizing the number of transformations of implementation property values, such as data structure values, back and forth over the course of a run of a computer program.

For consistency of definition in the context of the present application, it should be understood that the term "property", with respect to an object or component of a computer program, is broad, and includes narrower terms such as "location", "parameter", and "implementation". In turn, "implementation" includes "data representation" such as "string representation" (e.g. ASCII, EBCDIC, UNICODE) and "data structure" (e.g. hash, tree, compressed). Thus, it will be understood that "implementation" does not encompass "location", nor "parameter" within its meaning. Moreover, in the context of the present invention, "object", "entity", and "component" shall be interpreted as having substantially the same meaning, while "library" shall be understood to mean a group of object definitions or component definitions.

SUMMARY OF THE INVENTION

The present invention broadly provides a method for minimizing total cost of interaction among components of a computer program, each of the components being characterized by at least one implementation property. The method comprises the steps of:

a) carrying out at least a partial run of the program;

b) monitoring the at least partial run of the program to measure an amount of interaction between each pair of components;

c) determining a cost of interaction between each pair of interacting components;

d) determining a choice of implementation properties which minimizes total cost of the at least partial run; and e) assigning that choice of implementation properties to the components for a subsequent at least partial run of the program.

According to a preferred embodiment, the implementation property comprises a choice of string representation ( e.g. ASCII, UNICODE, EBCDIC ) of a component, the amount of interaction measured in step (b) comprising a frequency of interaction between each pair of interacting components. The aforesaid cost of interaction may comprise a function of the aforesaid frequency a cost of converting any differing string representations of the pair to a common string representation.

According to another preferred embodiment, the aforesaid implementation property comprises a choice of data structure (e.g. hash tree, and compressed data structures) of a component, the aforesaid amount of interaction measured in step (b) comprising a frequency of interaction between each pair of interacting components; the aforesaid cost of interaction comprising a function of the aforesaid frequency and a cost of converting any differing choices of data structures of the pair to a common choice of data structure.

Preferably, step (d) of determining the choice is carried out by a mathematical solution, as by building a graph with nodes representing program components and edges that join adjacent nodes representing interaction therebetween, each edge being characterized by a cost of each interaction, then using a graph cutting technique to find a minimum cut of the graph. Such graph cutting techniques are described in three U.S. patent application Ser. Nos. 09/676,423 by Rajan et al, U.S. patent application Ser. No. 09/676,424 by Wegman et al, and U.S. patent application Ser. No. 09/676,425 by Roth et al, all filed on Sep. 29, 2000.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
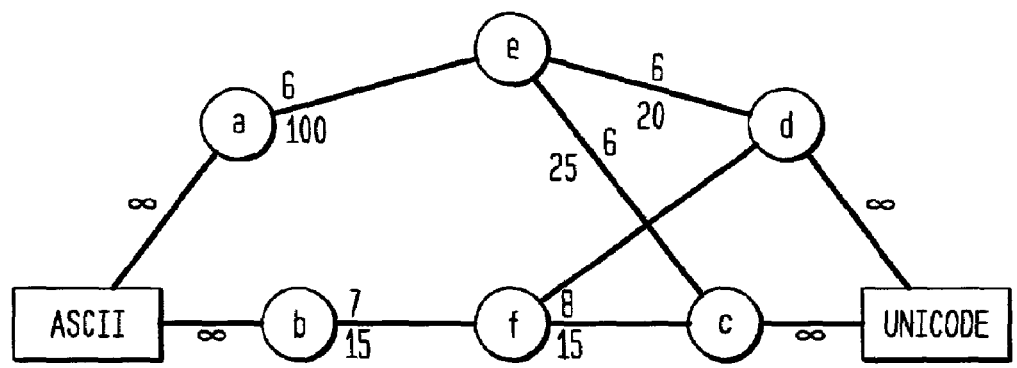
FIG. 1 is a schematic illustration, sometimes called an OAG (Object Affinity Graph), of program components, implementation properties, and interactions among components, according to an exemplary preferred embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

According to a preferred embodiment of the present invention, a method (e.g. by instrumenting the program itself, or by instrumenting the system on which the program runs), monitors a representative run of a program (i.e. a run which is similar to the kind of run for which the program is to be optimized—both in terms of the way the program is invoked, and in terms of kind of input data it is given). During the monitored run, the system notes the source variable, the destination variable, and the amount of data moved, for each operation in which data flows from one variable into another.

During or after the run, use this information to construct a graph as follows. For each variable seen during the run, create a non-terminal node corresponding to it. For each flow of data between two variables, create an edge between the two non-terminal nodes corresponding to the two variables, if such an edge does not already exist, and add to the weight of that edge an amount proportional to the amount of data that flowed. For all possible representations of data values seen during the run, create a terminal node corresponding to each such representation. For each use of a variable in an interface to an external program that required that variable to have a particular implementation, one may add an edge between the non-terminal node corresponding to that variable and the terminal node corresponding to the representation, with an infinite weight, if such an edge does not already exist.

Having constructed the graph, one may perform a multi-terminal minimum cut of the graph by any practical means. For each resulting partition, one per terminal node, one should transform the program so that in future runs of the program, each variable corresponding to non-terminal node in the partition will use the representation corresponding to the terminal node of the partition.

EXAMPLE

Figure 2:
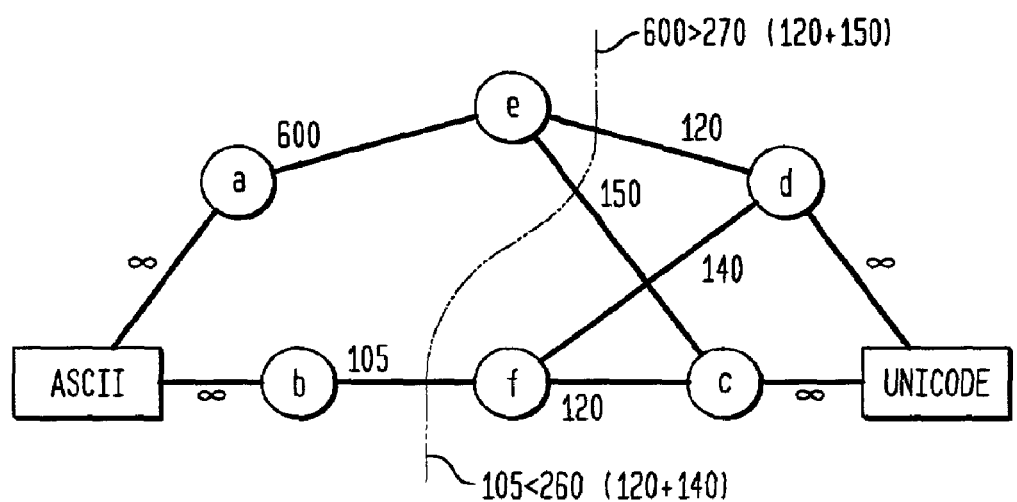
FIG. 2 is a schematic illustration derived from FIG. 1, showing a graph partition or graph cut that may minimize component interaction costs for a subsequent, at least partial, run of the program, according to the preferred embodiment of FIG. 1.

The following is a specific exemplary embodiment of the present invention Consider the case in which we are trying to minimizing the cost of running a comprising program components a, b, c, d, e, and f, which may be implemented in two implementations, in this case the string representations ASCII and UNICODE, as shown in FIG. 1. In this example, components a and b are in ACII code, and components c and d are in UNICODE The property we are seeking to determine is the data representations of component e and f. The first step is to run this program. For convenience we may run this program on one computer and monitor the interaction between components using a tool such as "Jinsight". This monitoring would provide the frequency of interaction between each pair of interacting components. This data, together with the cost based on transforming a component to ASCII and UNICODE, helps determine the total cost of interaction among components of the program. This cost of interaction is used to build the OAG (Object Affinity Graph) graph shown in FIG. 2. The nodes in the graph of FIG. 1 and FIG. 2 are the components a, b, c, d, e, and f and the implementations ASCII and UNICODE. The edges of FIG. 2 represent the frequency of interaction and the weights on the edges represent the cost of not implementing adjacent components in the same representation. These costs are a function of the frequency of interaction and the cost of each interaction.

In the example of FIG. 1, the frequencies of interaction, based on monitoring of the running of the program, are 100 for component a with component e, 20 for component e with component d, 25 for component e with component c, and so on, as shown. The cost of each interaction may be 6 for not transforming component e to ASCII via component a and and 6 for UNICODE via component d. The cost values for not transforming component f to ASCII via component b is 7, and so on, as shown in FIG. 1.

The cost values shown in FIG. 2 may then be derived from the frequency and weight values of FIG. 1. For example, the cost between components a and e is 6.times.100 or 600, while the cost between e and c is 6.times.25 or 150. The cost of interaction may then be minimized in accordance with the graph cutting techniques described in the aforementioned three U.S. patent application Ser. Nos. 09/676,423 by Rajan et al, 09/676,424 by Wegman et al, and 09/676,425 by Roth et al, all filed on Sep. 29, 2000.

As will be understood, the OAG graph of FIG. 2 should be cut on the side of component e away from component a because the cost of not implementing e in ASCII is 600, while the cost of not implementing e in UNICODE is only 270= (120+150). Similarly, the cut should implement component f in UNICODE because, non-implementation in UNICODE costs 260, while the cost of not implementing f in ASCII is only 105, as shown in FIG. 2.

Figure 3:
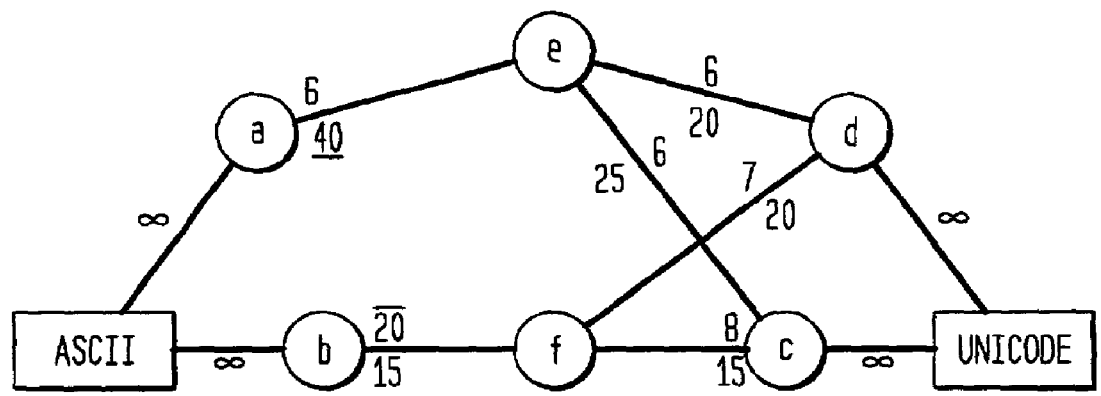
FIG. 3 is a is a schematic illustration, sometimes called an OAG (Object Affinity Graph), of program components, implementation properties, and different interactions among components, according to another exemplary preferred embodiment of the present invention.
Figure 4:
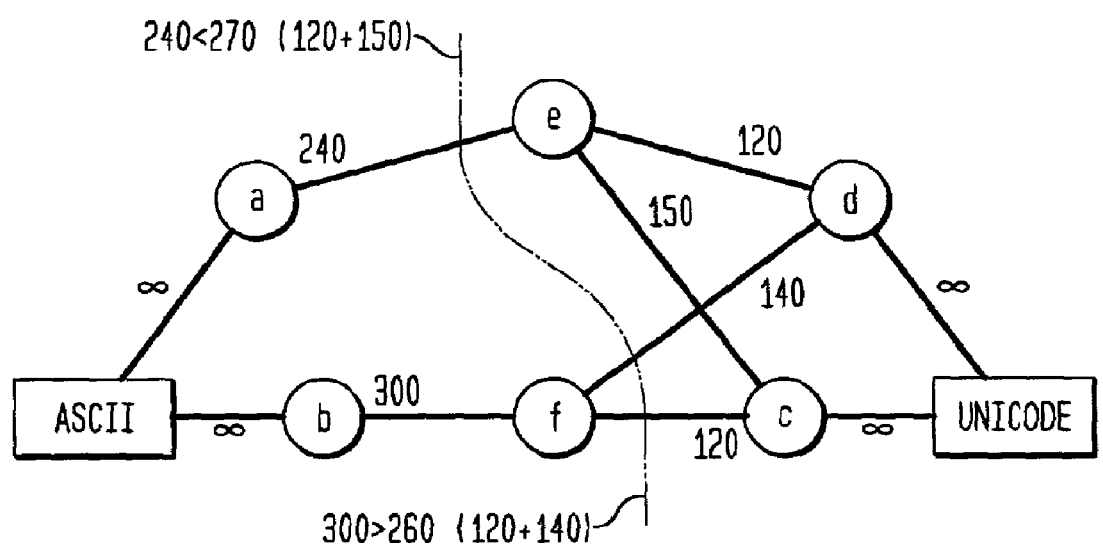
FIG. 4 is a schematic illustration derived from FIG. 3, showing a graph partition or graph cut that may minimize component interaction costs for a subsequent, at least partial, run of the program, according to the preferred embodiment of FIG. 3.

FIG. 3 and FIG. 4 show how the cost-minimizing cut changes when the interaction costs change. Thus, when frequency of interaction between a and e changes from 100 to 40 in FIG. 3, the overall cost drops in FIG. 4 to 240 which is less than the UNICODE affinity, Thus component e should be implemented in UNICODE based on the dotted cut line of FIG. 4, while component f should now be implemented in ASCII.

The future runs of the same program on this network of computers should be run with this implementation of components e and f to minimize the cost of running the program on the network.

As will now be understood from this example, the methods described in the three above-cited patent applications have the advantage of being able to find a cut quickly. This allows problems of a given size to be solved more quickly, and it allows larger problems to be solved within a given time constraint (problems which might not have been practical to even attempt to solve otherwise). A graph consists of nodes and edges. Each edge connects two nodes. A weight is associated with each edge. Some of the nodes are designated as being "terminal" nodes. The others are designated as being "non-terminal" nodes.

For use in optimizing data structure value representation conversion: each terminal node can represent a possible representation; each non-terminal node can represent a variable (the representation used by a particular variable is fixed over the course of the entire run); and the weight of each edge between two non-terminal nodes can represent the amount of data that was assigned back and forth over the course of a run between the variables corresponding to the two nodes that the edge connects, or the amount of work needed to convert that data. An edge between a non-terminal node and a terminal node can represent the fact that, due to external interface requirements, the variable corresponding to the non-terminal node must use the representation corresponding to the terminal node. In this case, the edge would be given infinite weight.

A multiway cut of a graph is the set of edges which, when removed from the graph, results in there no longer being a path through the graph from any terminal to any other terminal. A multiway minimum cut of a graph is a cut, the sum of the weights of whose edges is less than or equal to that of any other such cut. Such a cut partitions a graph into one partition for each terminal node. The partition for a terminal node consist of all non-terminal nodes connected to it directly, or indirectly via other non-terminal nodes.

In optimizing data structure value representation conversion, the non-terminal nodes in a partition represent variables that should use the representation corresponding to the terminal node of the partition, in order to keep representation conversions to a minimum, and hence to achieve best overall performance of the program.

The preferred embodiments of the present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

We claim:

1. A method for minimizing total cost of interaction among components of a computer program, each of the components being characterized by one or more data representation properties, the method comprising steps of:
   a) carrying out at least a partial run of the program;
   b) monitoring the at least partial run of the program to capture information on interaction between each pair of components, wherein the information on interaction comprises information relating to an explicit request from one component of the pair to the other component of the pair for some data, and wherein the monitoring comprises recording a source component, a destination component, and an amount of data;
   c) determining a cost of interaction between each pair of interacting components;
   d) determining a set of interrelated choices of the data representation properties of each of the components of at least one group of components which minimizes total cost of the at least partial run by building a graph with nodes representing program components and edges that join adjacent nodes representing interaction there between, each edge being characterized by a cost of each interaction, then using a graph cutting technique to find a minimum cut of the graph; and
   e) assigning the set of interrelated choices of the properties to the components for a subsequent at least partial run of the program.

2. The method of claim 1 wherein the data representation properties comprise a choice of string representation of a component, and the amount of interaction measured in step b) comprises a frequency of interaction between each pair of interacting components;
   the cost of interaction comprising a function of the frequency and cost of converting any differing string representations of the pair to a common string representation.

3. The method of claim 1, wherein at least one string representation is selected from ASCII, UNICODE, and EBCDIC.

4. The method of claim 1, wherein the data representation property comprises a choice of data structure of a component, the amount of interaction measured in step (b) comprising a frequency of interaction between each pair of interacting components;
   the cost of interaction comprising a function of the frequency and a cost of converting any differing choices of data structures of the pair to a common choice of data structure.

5. The method of claim 4, wherein at least one data structure is selected from hash, tree, and compressed data structures.

* * * * *